United States Patent
Minemura et al.

(10) Patent No.: US 7,440,379 B2
(45) Date of Patent: Oct. 21, 2008

(54) PRML (PARTIAL RESPONSE MAXIMUM LIKELIHOOD) INFORMATION REPRODUCING METHOD AND INFORMATION REPRODUCING APPARATUS FOR IMPLEMENTING THE SAME

(75) Inventors: Hiroyuki Minemura, Kokubunji (JP); Masaki Mukoh, Kokubunji (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 517 days.

(21) Appl. No.: 10/774,587

(22) Filed: Feb. 10, 2004

(65) Prior Publication Data
US 2005/0094539 A1 May 5, 2005

(30) Foreign Application Priority Data
Oct. 31, 2003 (JP) .............................. 2003-372885

(51) Int. Cl.
*G11B 7/005* (2006.01)
(52) U.S. Cl. ................................... 369/59.22
(58) Field of Classification Search ... 369/59.21–59.22, 369/53.33, 53.35, 47.17, 47.18; 375/316, 375/325, 340–341
See application file for complete search history.

(56) References Cited

U.S. PATENT DOCUMENTS 6,289,059 B1 * 9/2001 Yamaguchi et al. ......... 375/341
6,721,254 B1 4/2004 Yamaguchi
2001/0048649 A1 12/2001 Yamaguchi et al.
2002/0067677 A1 * 6/2002 Miyashita et al. ......... 369/59.16

FOREIGN PATENT DOCUMENTS

JP 9-231635 2/1996
JP 10-312640 5/1997
JP 2000-298836 4/1999

OTHER PUBLICATIONS

U.S. Appl. No. 10/643,975, filed Aug. 20, 2003, Minemura.
Naoki Ide, "Adaptive Partial-Response Maximum-Likelihood Detection in Optical Recording Media", Technical Digest of ISOM 2002, pp. 269-271.

* cited by examiner

*Primary Examiner*—Joseph Feild
*Assistant Examiner*—Nathan Danielsen
(74) *Attorney, Agent, or Firm*—Reed Smith LLP; Stanley P. Fisher, Esq.; Juan Carlos A. Marquez, Esq.

(57) ABSTRACT

An information reproducing method using PRML technology which provides asymmetry compensation and also assures media interchangeability. To compensate for asymmetry, target levels are basically adapted to readout signals and either restriction type (1) (time reversal and level reversal symmetry) or restriction type (2) (time reversal symmetry) is imposed between target levels. As a consequence, asymmetry compensation is made regardless of a readout signal distortion such as mark shift which might deteriorate media interchangeability.

2 Claims, 15 Drawing Sheets

FIG. 1
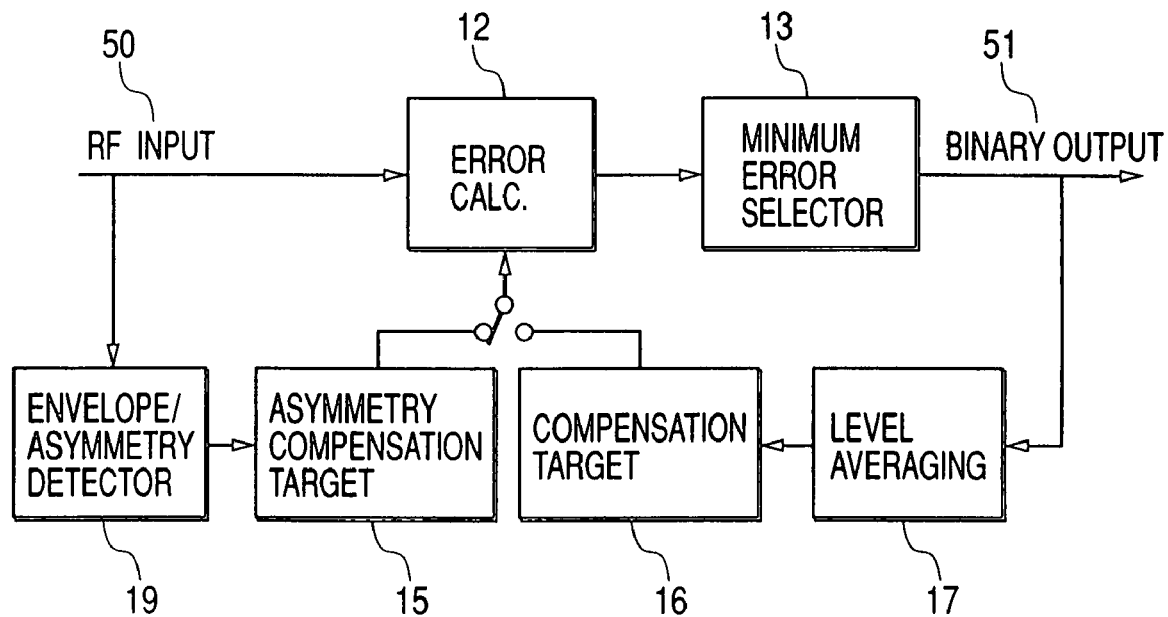
Prior Art FIG. 2
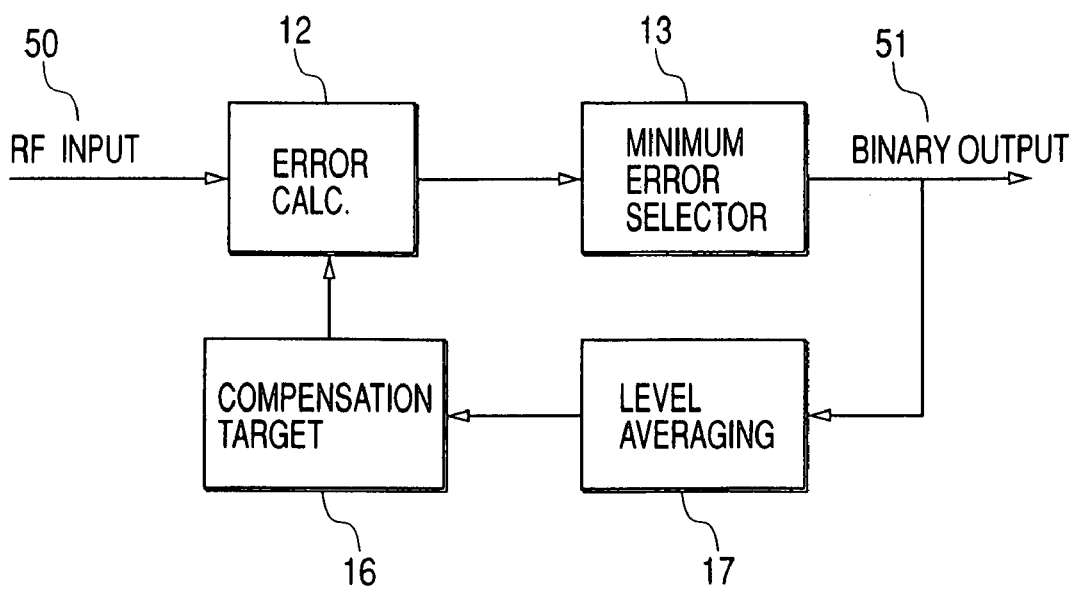

FIG. 4
SIGNALS OF RLL(1,7)
| Δ MARK | ASYMMETRY | HPF SIGNAL | DFB SIGNAL |
|---|---|---|---|
| −0.8Tw | −20% | 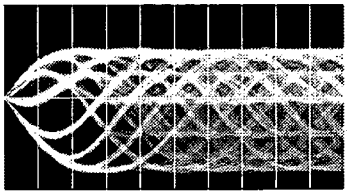 | 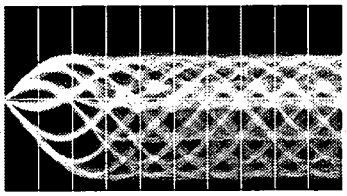 |
| −0.4Tw | −10% | 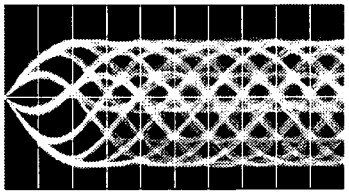 | 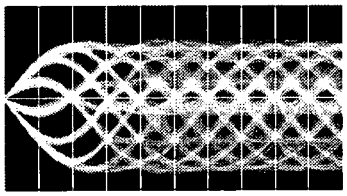 |
| ±0Tw | 0% | 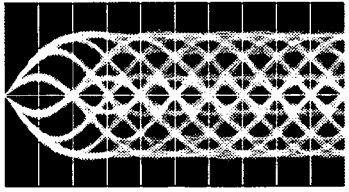 | 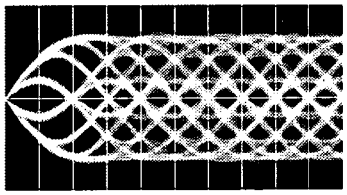 |
| +0.4Tw | +10% | 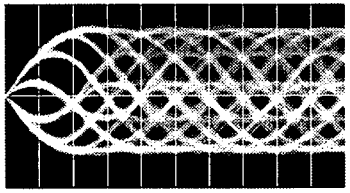 | 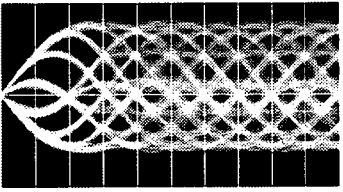 |
| +0.8Tw | +20% | 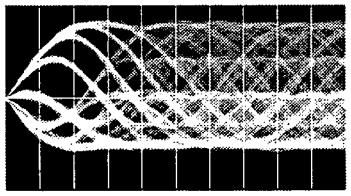 | 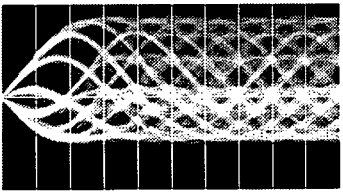 |
SIMULATION CONDITION
WAVELENGTH = 405nm
NUMERICAL APERTURE = 0.85
Tw = 75nm
MODULATION CODE = RLL(1,7)
PRCLASS = PR(1,2,2,1)
EQ = 11TAP(OPTIMIZED BY LSE METHOD)

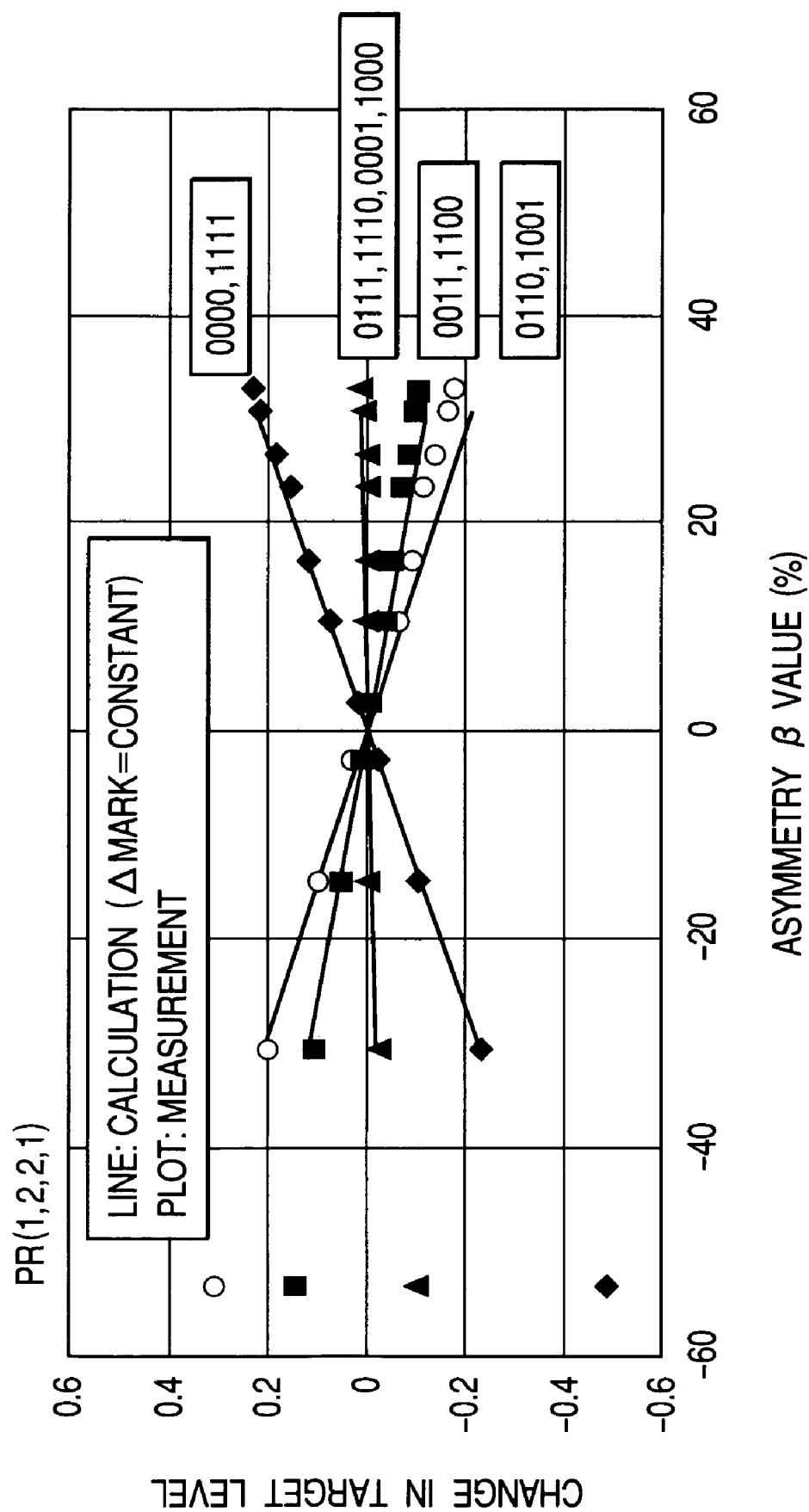

FIG. 6

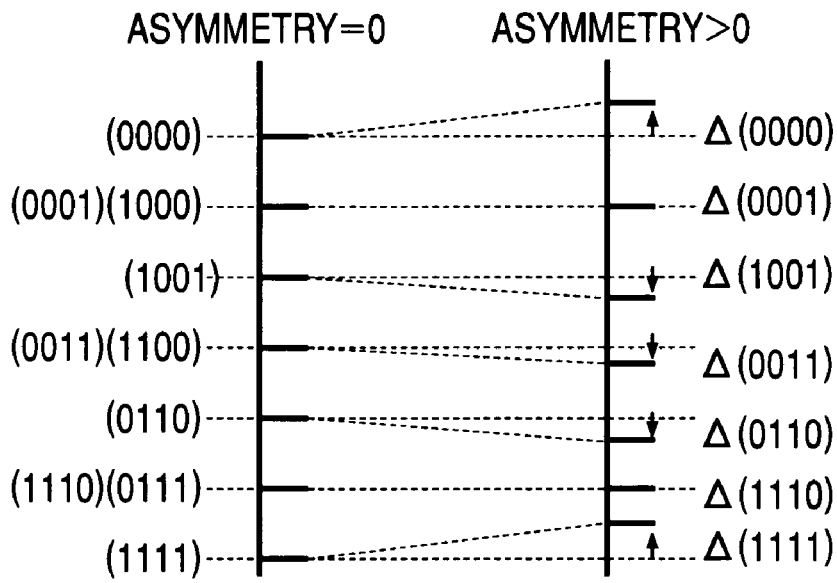

RULE OF ASYMMETRY FOR THE BLUE LD DISKS
(1) FOLLOWING FOUR LEVELS CAN BE REPRESENTED ALL 10 BIT ARRAYS $\Delta 4 = (\Delta(0000) + \Delta(1111))/2$
$\Delta 3 = (\Delta(0001) + \Delta(1000) + \Delta(1110) + \Delta(0111))/4$
$\Delta 2 = (\Delta(1001) + \Delta(0110))/2$
$\Delta E = (\Delta(0011) + \Delta(1100))/2$ (2) FOLLOWING PROPORTIONAL RELATIONSHIP IS FOUND
$\Delta 4 : \Delta 3 : \Delta 2 : \Delta E = 1 : 0.05 : -0.91 : 0.52$

---

SUMMARY:
BY USING THE ENVELOPE LEVELS OF READOUT SIGNAL ($\Delta 4$) OR ASYMMETRY, THE OPTIMUM TARGET LEVELS FOR PRML DETECTION CAN BE DEFINED

FIG. 7
SIGNALS OF RLL(2,10)
| ΔMARK | ASYMMETRY | HPF SIGNAL | DFB SIGNAL |
|---|---|---|---|
| −0.8Tw | −14% | 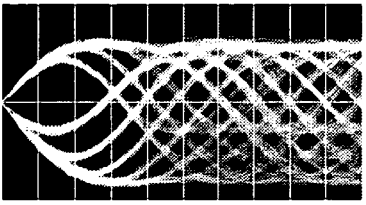 | 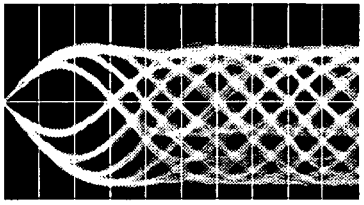 |
| −0.4Tw | −7% | 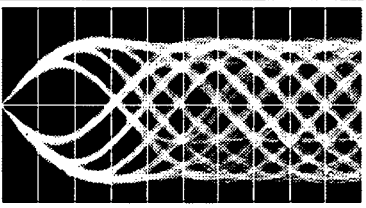 | 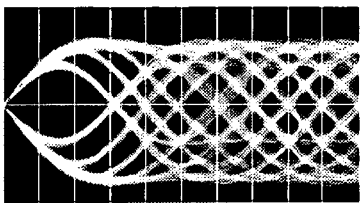 |
| ±0Tw | 0% | 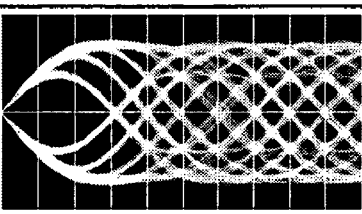 | 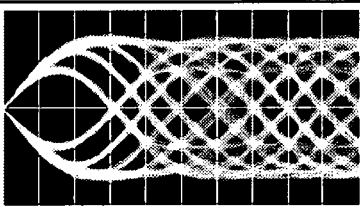 |
| +0.4Tw | +7% | 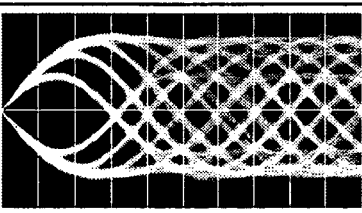 | 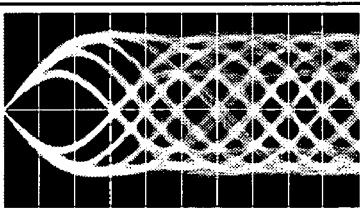 |
| +0.8Tw | +14% | 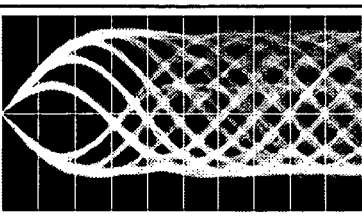 | 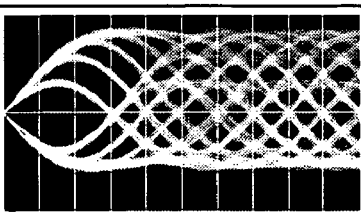 |
SIMULATION CONDITION
WAVELENGTH = 650nm
NUMERICAL APERTURE = 0.60
Tw = 133nm
MODULATION CODE = RLL(2,7)
PRCLASS = PR(3,4,4,3)
EQ = 11TAP(OPTIMIZED BY LSE METHOD)

RULE OF ASYMMETRY FOR DVD
(1) FOLLOWING THREE LEVELS CAN BE REPRESENTED ALL 8 BIT ARRAYS
   $\Delta 4 = (\Delta(0000) + \Delta(1111))/2$
   $\Delta 3 = (\Delta(0001) + \Delta(1000) + \Delta(1110) + \Delta(0111))/4$
   $\Delta E = (\Delta(0011) + \Delta(1100))/2$ (2) FOLLOWING PROPORTIONAL RELATIONSHIP IS FOUND
   $\Delta 4 : \Delta 3 : \Delta E = 1 : -0.15 : -0.31$

FIG. 10

| MODULATION CODE | PR CLASS (*) | HPF ONLY () | DFB (DUTY FEEDBACK) () SLICE CONTROL |
|---|---|---|---|
| RLL (1,7) BD | PR (1,2,2,1) | $\Delta 4: \Delta 3: \Delta 2: \Delta E =$ $1:0.05:-0.91:0.52$<br>$\Delta 4 = 0.009\,\alpha$ OR<br>$\Delta 4 = 0.007\,\beta$ | $\Delta 4: \Delta 3: \Delta 2: \Delta E =$ $1:0.36:-0.29:-0.04$<br>$\Delta 4 = 0.015\,\alpha$ OR<br>$\Delta 4 = 0.011\,\beta$ |
| RLL (2,10) DVD | PR (3,4,4,3) | $\Delta 4: \Delta 3: \Delta E =$ $1:-0.15:-0.31$<br>$\Delta 4 = 0.0087\,\alpha$ OR<br>$\Delta 4 = 0.0064\,\beta$ | $\Delta 4: \Delta 3: \Delta E =$ $1:0.11:-0.01$<br>$\Delta 4 = 0.010\,\alpha$ OR<br>$\Delta 4 = 0.008\,\beta$ |

(*) PR TARGET LEVEL NORMALIZATION
   TARGET LEVELS ARE NORMALIZED FOR ±1
   (TARGET LEVEL OF (0000) AND (1111) ARE ±1)

(**) LEVEL DEFINITIONS
   $\Delta 4 = (\Delta(0000) + \Delta(1111))/2$
   $\Delta 3 = (\Delta(0001) + \Delta(1000)$
       $+ \Delta(1110) + \Delta(0111))/4$
   $\Delta 2 = (\Delta(1001) + \Delta(0110))/2$
   $\Delta E = (\Delta(0011) + \Delta(1100))/2$ WHERE,
   $\Delta 4$ CAN BE MEASURED BY ENVELOPE DETECTION CIRCUIT,
   OR CAN BE CALCULATED FROM $\alpha$ (SIGNAL ASYMMETRY IN %)
   AND $\beta$ ($\beta$ VALUE IN %)

FIG. 14

| CONTENTS | BASIC PRML | ADAPTIVE PRML | OUR INVENTION |
|---|---|---|---|
| TARGET LEVELS | FIXED | ADAPTIVE TO READOUT SIGNAL | ADAPTIVE TO ASYMMETRY |
| ASYMMETRY COMPENSATION | × | ○ | ○ |
| WRITE CONDITION ADJUSTMENT | × | △ | ○ |
| MEDIA INTERCHANGEABILITY | △ | × | ○ |

| MODE | ASYMMETRY COMPENSATION TARGET | COMPENSATION TARGET (NO RESTRICTION) |
|---|---|---|
| ADJUST BEFORE SHIPMENT | ○ | × |
| FIELD STUDY | ○ | × |
| VERIFY | ○ | × |
| READ | ○ | ○ |
| READ RETRY | × | ○ |

PRML (PARTIAL RESPONSE MAXIMUM LIKELIHOOD) INFORMATION REPRODUCING METHOD AND INFORMATION REPRODUCING APPARATUS FOR IMPLEMENTING THE SAME

FIELD OF THE INVENTION

The present invention relates to a data storage which uses interchangeable optical disks and more particularly to an information reproducing method which improves media interchangeability of high-speed, large-capacity and/or different types of optical disks and an information reproducing apparatus based thereon.

BACKGROUND OF THE INVENTION

With the spread of CDs and DVDs, development of next-generation optical disks which use blue laser diodes is in progress and demand for larger capacity optical disks is growing. An optical disk device which provides not only a CD readout (reproduction) function but also a readout function for CDs and DVDs and a recording function for CD-R/RW, DVD-RAM, and DVD-R/RW is already commercially available. Therefore, interchangeability should be improved in order to perform recording/readout of optical disks which comply with different standards.

The PRML (Partial Response Maximum Likelihood) method has been widely used as a means to increase the capacity of a magnetic disk because it is very effective in improving S/N ratios. In the PRML method, readout signals at consecutive N times are compared with target signal levels and converted into the most likely bit stream (array). Although the direct slice method has been long used for optical disk readout, it seems no longer able to cope with the growing demand for higher speed and larger capacity optical disks. For this reason, the use of the PRML method for optical disk readout is spreading.

There are two problems in applying the PRML method to optical disk readout. One problem is asymmetry. Since a target signal for PRML is calculated by convolution of impulse response (PR class) and bit stream (array), the voltage level is vertically symmetric with respect to the center value. On the other hand, in an optical disk, when the write (recording) power is increased to increase the asymmetry value, the amplitude of a signal also increases and thus the S/N ratio improves. Therefore, generally in an optical disk, the quality of the signal is the best when asymmetry>0. This phenomenon does not occur in a magnetic disk where the width of the read head is smaller than the mark width. In an optical disk, the readout signal level is asymmetric with respect to the voltage level and thus it is difficult to make it agree with the target signal for PRML.

The second problem is media interchangeability. In conventional optical disks the Direct Slice Method is used for readout and the signal quality is defined as jitter which is a deviation between clock edges. Also in the direct slice method, the DFB (Duty Feed-Back) technique or the like should be used to control the slice level. Since a DFB circuit makes an automatic compensation for asymmetry as mentioned above, it is possible to measure jitter which does not depend on asymmetry.

The Technical Digest of ISOM 2002, 269-271 (2002) (non-patent literature 1) describes, as an example of application of the PRML method to optical disks, Adaptive PRML in which readout is done while the target signal level is adaptively changed to cope with a radial or circumferential disk tilt. FIG. 2 schematically shows the adaptive PRML reproduction method described by non-patent literature 1. A PRML decoder is composed of a Level Error Calculation Unit 12, a Minimum Error Condition Selecting Unit 13, a Compensation Target Value Table 16, and a Level Averaging Unit 17. A readout signal 50 is a signal obtained by conversion of an analog signal into digital data by an A/D converter and its equalization. The level error calculation unit 12 calculates the value of the compensation target value table 16 and the square value (Branch Metric Value) of the readout signal value and the minimum error condition selecting unit 13 selects the most likely bit stream or array and outputs a binary result 51. The level averaging unit 17 recomposes bit streams from the binary result 51, averages them for each signal level, and stores the result in the compensation target value table 16.

The method shown in FIG. 2 provides a solution to the problem of asymmetry (problem 1) because all target signal levels are adjusted in a way to follow readout signals. However, even when a mark is shifted (NG case of large jitter), the target signal level is adjusted to compensate for the readout signal distortion so no error signal is generated and the signal quality may be misjudged as good. This results in a failure to assure media interchangeability (problem 2), making it difficult to configure an optical disk system. As explained above, the conventional PRML method has the problems of asymmetry and media interchangeability.

SUMMARY OF THE INVENTION

An object of the present invention is to provide an information reproducing method which solves the above problems inherent to the prior art, namely, compensates for asymmetry and assures excellent readout performance without any deterioration in media interchangeability and an optical disk device which uses the method.

The relationship between asymmetry of optical disk readout signals and the PRML method is described below. FIG. 3 shows a simulation model which was used in studying optical disk readout signals. Basically, using an optical simulator which performs scalar diffraction calculation, an optical head step response is calculated and a readout signal is obtained by convolution of the calculated response and recording binary data. Disk noise is added as S/N ratio to the recording binary data, and system noise is added to the convoluted signal. In this way, a pseudo readout signal is generated, taking head aberration, disk noise and system noise into consideration independently.

FIG. 4 summarizes calculation results of next-generation DVD readout signals which were generated from the above simulation model. Here, the wavelength of laser diode was 405 nm, numerical aperture of the objective lens 0.85, window width Tw 75 nm, modulation code RLL (1,7), disk noise −26 dB, and system noise −30 dB. Regarding asymmetry, all marks were treated as uniformly longer than the reference by Δ. PR class was PR (1,2,2,1). The number of bit arrays which meets the RLL (Run Length Limited) conditions was 10. For equalization of readout signals, an equalization parameter study was conducted using the well-known LSE (Least Square Error) technique, on condition that tap number was 11. For slice level control, two techniques: the HPF (High Pass Filter) technique which is commonly used for magnetic disks and the above DFB technique which is commonly used for optical disks, were used. The asymmetry value was −20% for Δ mark −0.8 Tw, −10% for −0.4 Tw, 0% for 0 Tw, +10% for +0.4 Tw, and +20% for +0.8 Tw. When asymmetry is not equal to 0, the PR class target signal level does not agree with the readout signal level.

On the assumption that all marks are uniformly longer than the reference by Δ, ten bit arrays are divided into the following four groups in terms of symmetry. In each bit array group, the difference from the PR class target signal level is equal. Here, the term symmetry means symmetry with respect to time reversal and level reversal for bit arrays.

| | |
|---|---|
| (a) bit arrays (0, 0, 0, 0) and (1, 1, 1, 1) | 4T peak level (Δ4) |
| (b) bit arrays (0, 1, 1, 1), (1, 1, 1, 0), (0, 0, 0, 1) and (1, 0, 0, 0) | 3T peak level (Δ3) |
| (c) bit arrays (0, 1, 1, 0) and (1, 0, 0, 1) | 2T peak level (Δ2) |
| (d) bit arrays (0, 0, 1, 1) and (1, 1, 0, 0) | edge level (ΔE) |

Media interchangeability can be improved by applying this relational restriction to the method described in non-patent literature 1, because asymmetry compensation is made with no target level compensation for a distorted readout signal, or a readout signal with shift of a specific mark.

In an ordinary optical disk, the reflectivity of marks is low, so a mark is defined as "1" and a space as "0". In that case, it is natural to define PR class as (−1, −2, −2, −1). If so, for example, bit array (0,0,0,0) has 4 T space level and its target voltage level is the maximum. In the present invention, in order to avoid confusion, PR class is hereinafter expressed in a conventional manner, namely by PR (1,2,2,1) instead of by PR (−1, −2, −2, −1).

FIG. 5 is a graph summarizing measurements of level changes in readout signals corresponding to PR class bit arrays where a write-once disk having a phase-change recording film with a track pitch of 0.32 μm was used and the write power was varied. In the graph, plot points represent actual measured values and lines represent simulation results. Change=0 means that the PR class target level agrees with the readout signal. The HPF technique was used for readout. β value (which is widely used for CD-R/DVD-R) was measured to determine the asymmetry value. Regarding the above four bit array groups, the graph shows that the actual measured values agree with the simulation results. This demonstrates correctness of the assumption that the length of all marks varies uniformly as the write power increases. The amounts of change in signal level are proportional to the asymmetry value.

FIG. 6 is a graph showing target level changes schematically. When asymmetry=0, the target level is the reference target level, namely the PR (1,2,2,1) class target level. When asymmetry≠0, the target levels of the ten bit arrays change individually but the amounts of change can be divided into four types in terms of symmetry: Δ4, Δ3, Δ2, and ΔE which are proportional to the asymmetry value. When the HPF technique is used for readout, the following proportionality relation exists:

$$\Delta 4 : \Delta 3 : \Delta 2 : \Delta E = 1 : 0.05 : -0.91 : 0.52$$

Based on this, the target level for a readout signal can be determined in either of the following two ways:
(1) The asymmetry value of the readout signal is measured and the target level is determined using the relation shown in FIG. 5.
(2) The top and bottom envelope levels of the readout signal are measured to calculate the Δ4 value and the other target levels are calculated using the above ratio.

In the case of the adaptive PRML method described in non-patent literature 1, adaptation is made not only to asymmetry but also to distortion of readout signals and thus the target level changes, causing deterioration in media interchangeability. On the other hand, in the present invention, it is possible to provide a PRML-based readout method which follows asymmetry but does not follow distortion of readout signals by imposing an asymmetry-dependent relational restriction between target levels, so that media interchangeability is assured.

Given below is a similar study where the modulation code was RLL (1, 10) code which is used in current DVDs and CDs.

FIG. 7 shows a summary of DVD readout signals which were calculated from the simulation model. Here, the wavelength of laser diode was 660 nm, numerical aperture of the objective lens 0.60, window width Tw 140 nm, modulation code RLL (2, 10), disk noise −23 dB, and system noise −34 dB. PR class was PR (3,4,4,3). The number of bit arrays which meets the RLL (Run Length Limited) conditions was 8. For equalization of readout signals, an equalization condition study was conducted using the LSE technique, on condition that tap number was 11. For slice level control, the HPF technique and the DFB technique were used. The asymmetry value was −14% for A mark −0.8 Tw, −7% for −0.4 Tw, 0% for 0 Tw, +7% for +0.4 Tw, and +14% for +0.8 Tw. When asymmetry is not equal to 0, the PR class target signal level does not agree with the readout signal level.

On the assumption that all marks are uniformly longer than the reference by Δ, eight bit arrays are divided into the following three groups in terms of symmetry. In each bit array group, the difference from the PR class target signal level is equal.

| | |
|---|---|
| (a) bit arrays (0, 0, 0, 0) and (1, 1, 1, 1) | 4T peak level (Δ4) |
| (b) bit arrays (0, 1, 1, 1), (1, 1, 1, 0), (0, 0, 0, 1) and (1, 0, 0, 0) | 3T peak level (Δ3) |
| (c) bit arrays (0, 0, 1, 1) and (1, 1, 0, 0) | edge level (ΔE) |

FIG. 8 is a graph summarizing target level changes for different bit array groups. The HPF technique was used for readout. Like the above next-generation DVD, the amounts of change in signal level are proportional to the asymmetry value.

FIG. 9 is a graph showing target level changes schematically. In the graph, plot points represent actual measurement results at the double speed of a commercial DVD-RAM disk. When asymmetry=0, the target level is the reference target level, namely the PR (3,4,4,3) class target level. When asymmetry≠0, the target levels of the eight bit arrays change individually but the amounts of change can be divided into three types in terms of symmetry: Δ4, Δ3, and ΔE which are proportional to the asymmetry value. When the HPF technique is used for readout, the following proportionality relation exists:

$$\Delta 4 : \Delta 3 : \Delta E = 1 : -0.15 : -0.31$$

As in the case of the next-generation DVD, based on this, the target level for a readout signal can be determined in either of the following two ways:
(1) The asymmetry value of the readout signal is measured and the target level is determined using the relation shown in FIG. 9.
(2) The top and bottom envelope levels of the readout signal are measured to calculate the Δ4 value and the other target levels are calculated using the above ratio.

As explained so far, a similar relation was obtained even when the RLL (2, 10) modulation code (which is used for DVD/CD) was used. Accordingly, in the adaptive PRML method, an asymmetry-dependent relational restriction can be imposed between target levels so that it is possible to provide a PRML method which assures media interchangeability while at the same time following asymmetry. Here, target level restriction corresponds to time reversal and level reversal symmetric restrictions.

According to the present invention, readout performance is improved with asymmetry compensation and at the same time media interchangeability is assured.

BRIEF DESCRIPTION OF THE DRAWINGS

The invention will be more particularly described with reference to the accompanying drawings, in which:

FIG. 1 is a block diagram showing the general structure of an information reproducing apparatus according to an embodiment of the present invention;

FIG. 2 is a block diagram schematically showing the method described in non-patent literature 1;

FIG. 4 is a graph summarizing experimental data of next-generation DVD readout signals from the simulation model;

FIG. 5 is an asymmetry versus target level change graph which is based on measurements in an experiment of next-generation DVD readout signals;

FIG. 6 is a graph showing target level changes in next-generation DVD readout signals;

FIG. 7 is a graph summarizing experimental data of current DVD readout signals from the simulation model;

FIG. 10 is a table summarizing how to determine target levels according to the asymmetry value or signal envelop value for next-generation DVD and current DVD;

FIG. 14 is a table summarizing the effects of the present invention;

DETAILED DESCRIPTION OF THE PREFERRED EMBODIMENTS

Figure 3:
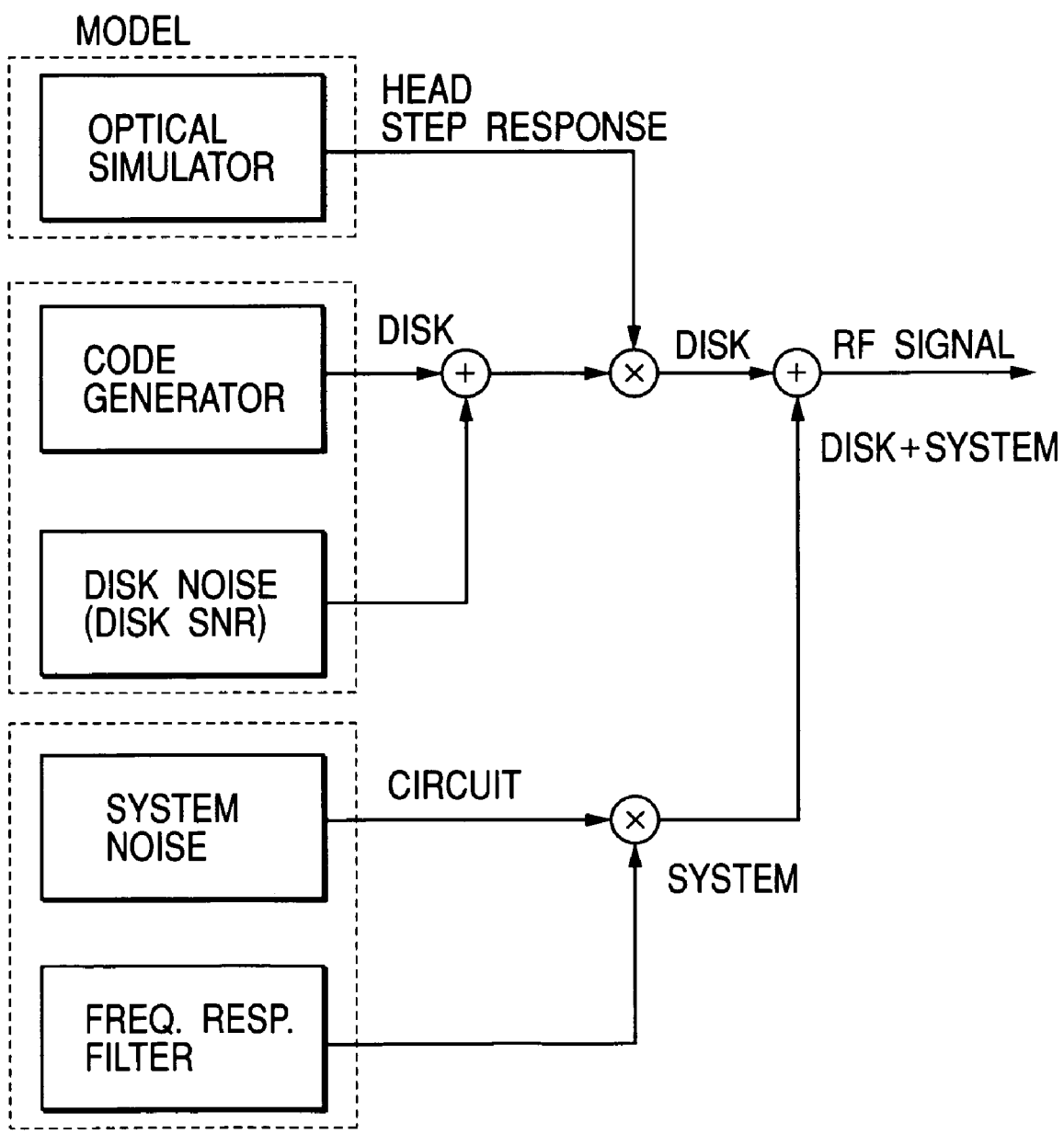
FIG. 3 shows a simulation model which was used in a study of optical disk readout signals.
Figure 8:
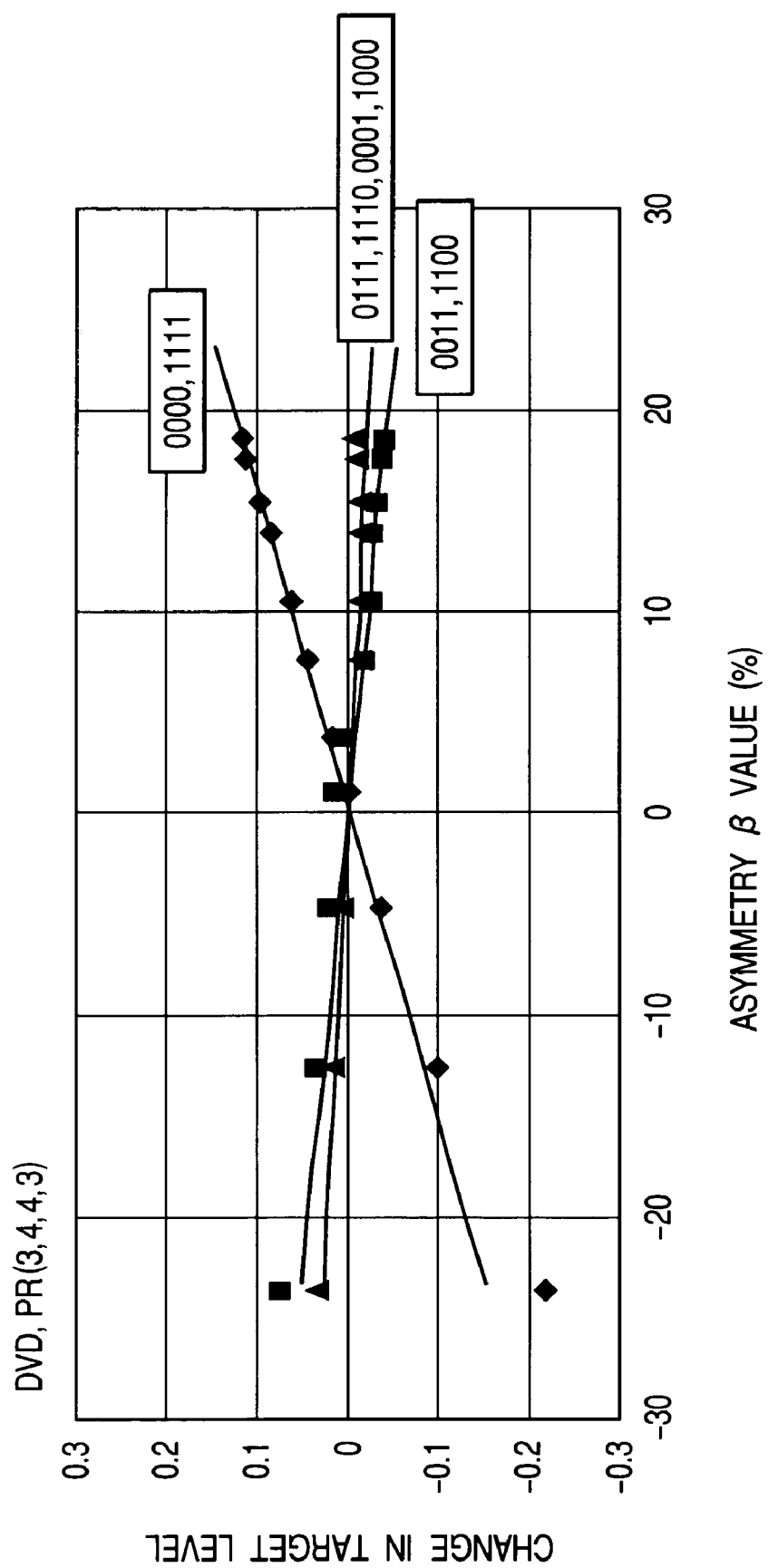
FIG. 8 is an asymmetry versus target level change graph which is based on experimental data of current DVD readout signals.
Figure 9:
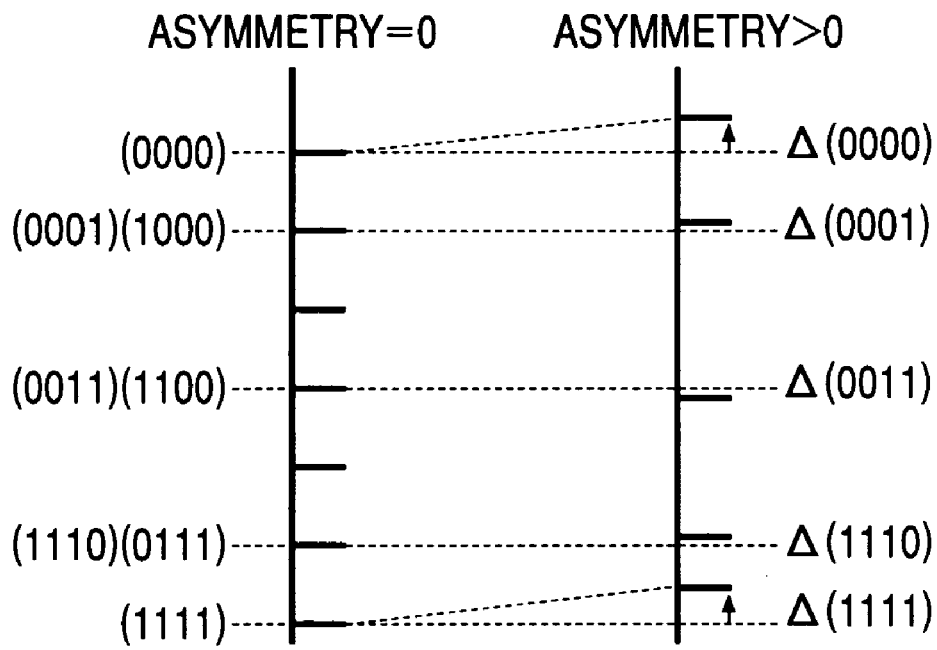
FIG. 9 is a graph showing target level changes in current DVD readout signals.

Next, preferred embodiments of the present invention will be described in detail referring to the accompanying drawings.

FIG. 10 summarizes how to determine target levels according to the asymmetry value or signal envelop value for next-generation DVD and current DVD. This table is based on the above assumption that Δ mark changes uniformly. Here, for slice level compensation, two techniques, HPF and DFB, were used. For asymmetry, a value (what is called an asymmetry value) and β value (which can be easily measured in a drive unit) were used.

FIG. 1 is a block diagram showing the general structure of an information reproducing apparatus according to an embodiment of the present invention. A PRML decoder is composed of a Level Error Calculation Unit 12, a Minimum Error Condition Selecting Unit 13, an Asymmetry Compensation Target Value Table 15; a Compensation Target Value Table 16, a Level Averaging Unit 17; and an Envelope/Asymmetry Detector 19. A readout signal 50 is a signal obtained by conversion of an analog signal into a digital signal by an A/D converter and its equalization. The level error calculation unit 12 calculates the square value (Branch Metric Value) of difference from the target value for each bit array, referring to the asymmetry compensation target table 15 or compensation target value table 16. The minimum error condition selecting unit 13 adds a branch metric value (corresponding to each bit array) to metric values in a previous state (just before current time) and various states (these metric values are obtained by adding a branch metric value one after another upon each state transition and performing a process to prevent divergence). The selecting unit 13 selects the smaller value from metric values in transitional states up to the current time state (usually two states, occasionally one due to limited run length). Here, a state means a bit array which is stored for transition at a time; when PR class bit is, for example, 4, a bit array is expressed by four bits and a state by three bits. Each selection made by the minimum error condition selecting unit 13 is stored in a pass memory so that upon elapse of a sufficiently long time, the stored content is merged and binary result 51 can be obtained, though not shown here. The level averaging unit 17 recomposes bit arrays from the binary result 51 and averages them for each signal level and stores the result in the compensation target value table 16.

The envelope asymmetry detection unit 19 measures top and bottom envelope levels or asymmetry values of readout signals to determine target levels using the ratios shown in FIG. 10. In this constitution, decoding is done while only a compensation for the asymmetry value is made using the asymmetry compensation target value table 15, on the following occasions:

(1) verification to check the quality of readout signals (the target signal levels used for verification are a fixed target value plus a compensation value)
(2) writing condition adjustment
(3) focusing offset and lens tilt adjustment On the other hand, decoding is done with a widened readout margin using the compensation target value table 16 in the following cases:

(1) a read error occurs
(2) the quality of readout signals is judged as not good Switching between the tables 15 and 16 as mentioned above assures both media interchangeability and wide readout margin. Although FIG. 1 illustrates that switching between the tables 15 and 16 is made by a switch, any other means that allows selective use of data from the tables may be used instead of such a switch.

Another effect of the present invention is improvement in target level stability. In the structure in FIG. 2 described in non-patent literature 1 and the structure in FIG. 1, the level averaging unit 17 calculates target levels based on the binary result 51. If the initial data in the compensation target value table is not correct, or when PLL (Phase Locked Loop) clock is not stabilized yet (for example, just after an access), the binary result 51 would be incorrect; if the target level should be updated based on such an incorrect binary result, the updated target level would be incorrect and the result of decoding would also be incorrect. However, the envelope/asymmetry detection unit 19 determines target levels independently of the binary result (decoding result) 51. In other words, it determines correct target values regardless of initial data in the compensation target value tale and PLL clock stability, thereby improving stability.

Figure 11:
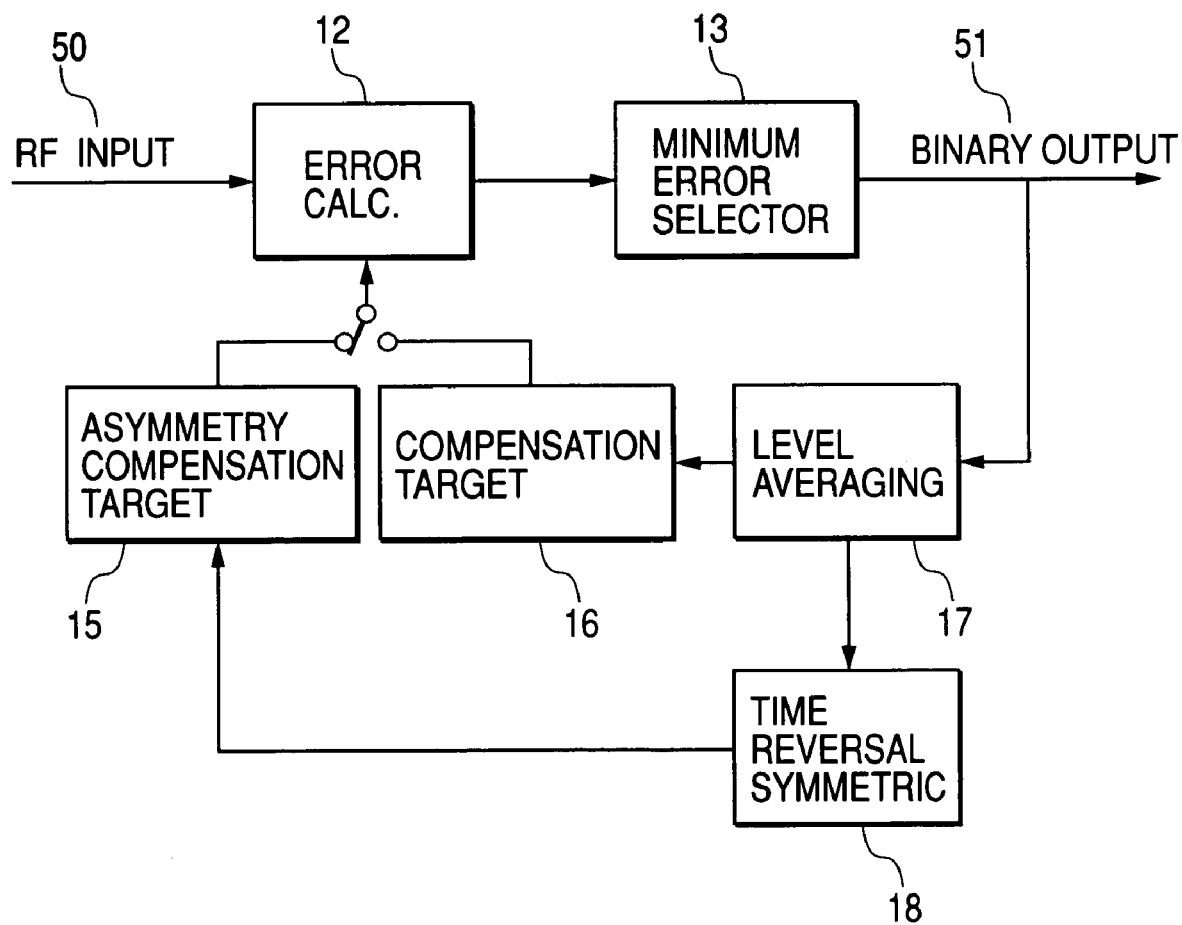
FIG. 11 is a block diagram showing an information reproducing apparatus according to another embodiment of the present invention.

FIG. 11 is a block diagram showing an information reproducing apparatus according to another embodiment of the present invention. In the method shown in FIG. 1, for target levels, time reversal and level reversal symmetric restrictions are imposed and each target level is determined in proportion to the asymmetry value on the following three preconditions:
(1) Readout signals are properly equalized in regard to PR class.
(2) Voltage offset which remains in a slice level controller is small enough.
(3) The AGC (Automatic Gain Controller) functions with a satisfactory accuracy and the difference between the readout signal amplitude and target level amplitude is small.

In an actual optical disk device, since the recording drive differs depending on the disk position, there might be a signal amplitude difference or the resolution may change due to a variation in the disk medium board thickness or a disk tilt. Also, when circuitry is used, slice level offset might not become zero. If that is the case, the readout signal error rate might increase when the relations shown in FIG. 10 are forced.

In order to avoid the above situations, it is effective to ease the time reversal and level reversal symmetric restrictions on target levels and impose only the time reversal symmetric restriction. When the level reversal symmetric restriction is eliminated in this way, it is no longer necessary to meet the above preconditions (2) (slice level offset) and (3) (AGC accuracy). Also, the precondition (1) concerning equalization can be eased by changing the inter-level ratio from a constant value to a value which depends on a readout signal. This is equivalent to a time reversal symmetric restriction on target levels in the structure shown in FIG. 2 (described in non-patent literature 1). When a time reversal symmetric restriction is imposed, no compensation is made for shift of a specific mark and media interchangeability is thus assured.

Referring to FIG. 11, the time reversal symmetric unit 18 performs a time reversal symmetric process on the result of calculation by the level averaging unit 17. For example, in case of PR (1, 2, 2, 1), level changes are grouped into the following seven level types. This means that when target levels for PR (1, 2, 2, 1) are equal, compensation targets should be equal.

| | |
|---|---|
| (a) bit array (0, 0, 0, 0) | 4T space level (Δ4S) |
| (b) bit array (1, 1, 1, 1) | 4T space level (Δ4M) |
| (c) bit arrays (0, 0, 0, 1) and (1, 0, 0, 0) | 3T space level (Δ3S) |
| (d) bit arrays (0, 1, 1, 1) and (1, 1, 1, 0) | 3T mark level (Δ3M) |
| (e) bit array (1, 0, 0, 1) | 2T space level (Δ2S) |
| (f) bit array (0, 1, 1, 0) | 2T mark level (Δ2M) |
| (g) bit arrays (0, 0, 1, 1) and ((1, 1, 0, 0) | edge level (ΔE) |

Output of the time reversal symmetric unit 18 is stored in the asymmetry compensation target value table 15. The components shown in FIG. 11 except the time reversal symmetric unit 18 are functionally the same as those shown in FIG. 1.

In the above embodiments, it is assumed that the asymmetry compensation target value table 15 and the compensation target value table 16 are separate components. However, in an actual manufacturing process, it is easy to make a single memory element containing these tables in order to reduce the circuit size. If that is the case, a target value generator (which combines the level averaging unit 17 and envelope/asymmetry detection unit 19 or time reversal symmetric unit 18) is turned On or Off instead of switching between the target tables.

Next, the effects or advantages of the present invention will be explained based on experimental data. One advantage is improvement in readout performance by asymmetry compensation. FIGS. 12A to 12D show relationships among write power, bit error rate, and RMS error which were found from the above experiment of the next-generation DVD. In the experiment, a write-once disk having a phase-change recording film with a track pitch of 0.32 μm was used as a disk medium. Here, the wavelength of laser diode was 405 nm, numerical aperture of the objective lens 0.85, detection window width Tw 75 nm, modulation code RLL (1, 7), and write/read speed 200 Mbps. HPF was used as a means for slice level control. Here, RMS error refers to a difference between a readout signal level and a target level. This is also called "miss-equalization."

Figure 12A:
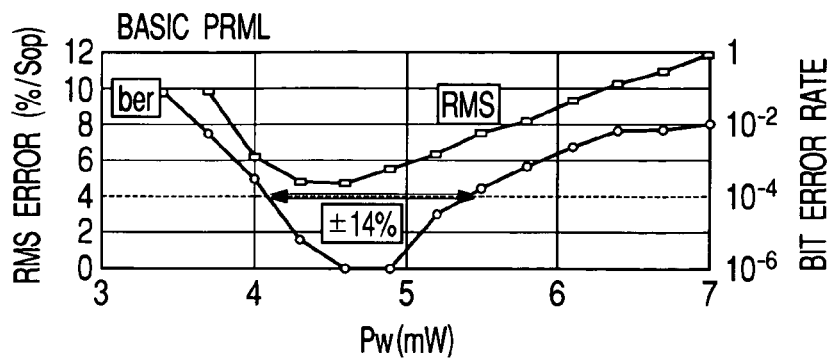
FIGS. 12A, 12B, 12C, and 12D are graphs showing the relationship among the next-generation DVD write power, bit error rate and RMS error rate for basic PRML, Method 1, Method 2, and Method 3, respectively.
Figure 12B:
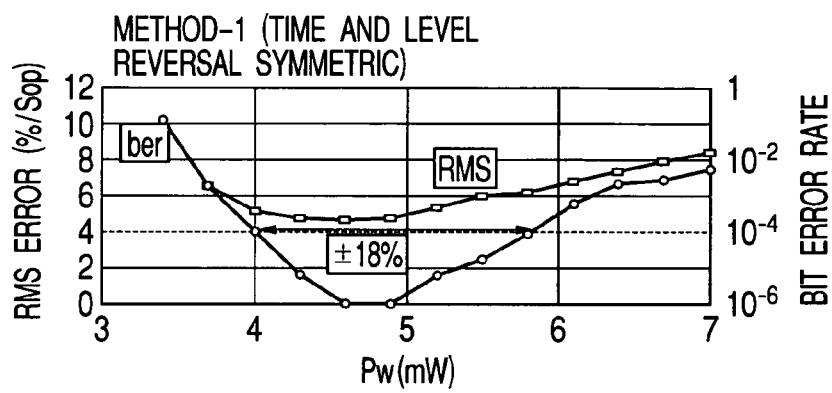
Figure 12C:
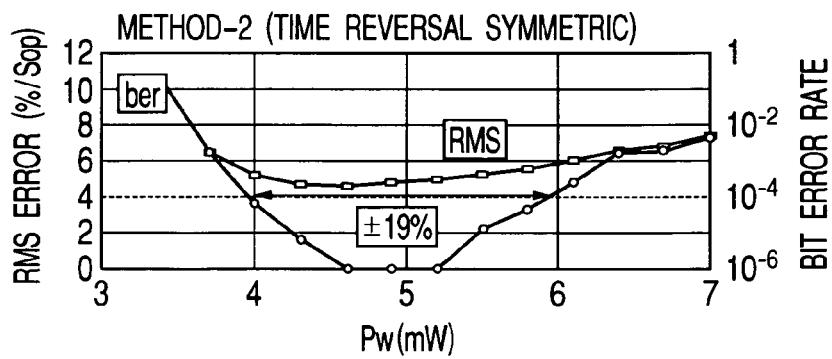
Figure 12D:
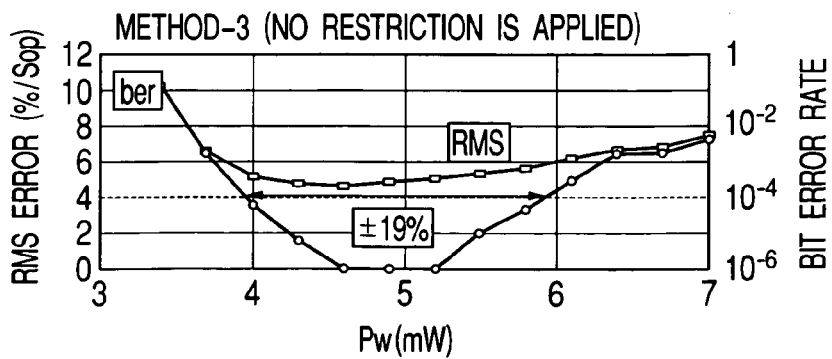

FIG. 12A shows experimental data from basic PRML with no target level compensation; FIG. 12B shows experimental data from the embodiment shown in FIG. 1; FIG. 12C shows experimental data from the embodiment shown in FIG. 11; and FIG. 12D shows experimental data from the method shown in FIG. 2 as described in non-patent literature 1. In the case of basic PRML (FIG. 12A), the minimum bit error rate is on a higher power side than the minimum RMS error value. The RMS error value is the minimum in the vicinity of the point where the asymmetry value is zero. This difference demonstrates that the quality of optical disk signals is the best when the asymmetry value is larger than zero. FIGS. 12B, 12C, and 12D indicate that the write power margin for bit error rates is wider because the increase in RMS error value with change in write power is smaller. These findings suggest that the readout performance has improved due to asymmetry compensation.

Figure 13A:
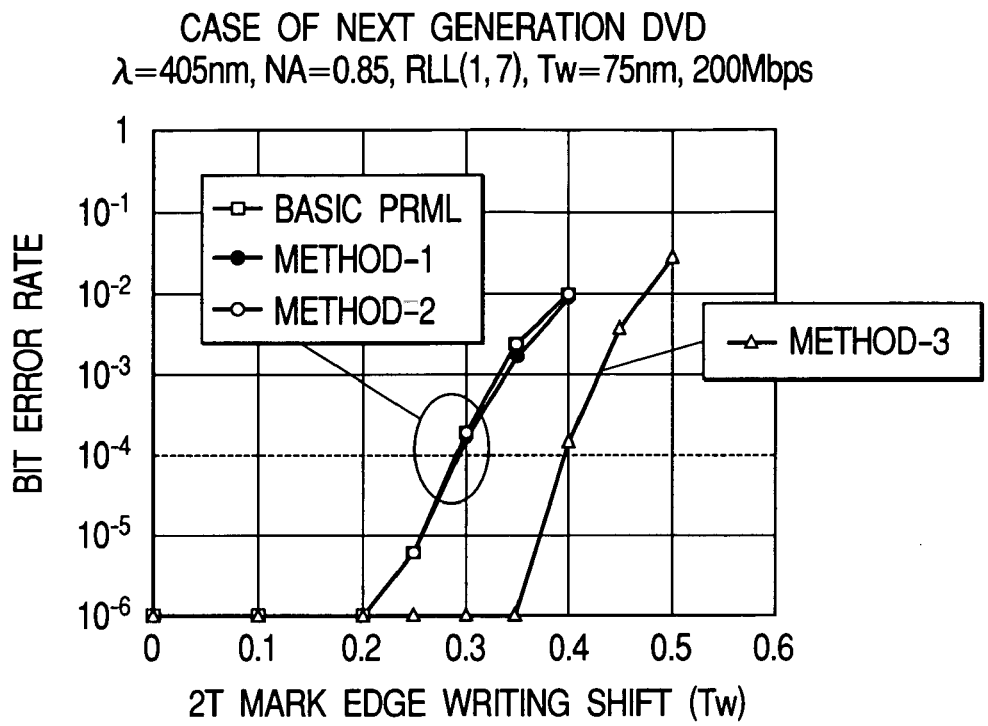
FIGS. 13A and 13B are graphs showing the relationship between mark shift and bit error rate for the next-generation DVD and the current DVD, respectively.
Figure 13B:
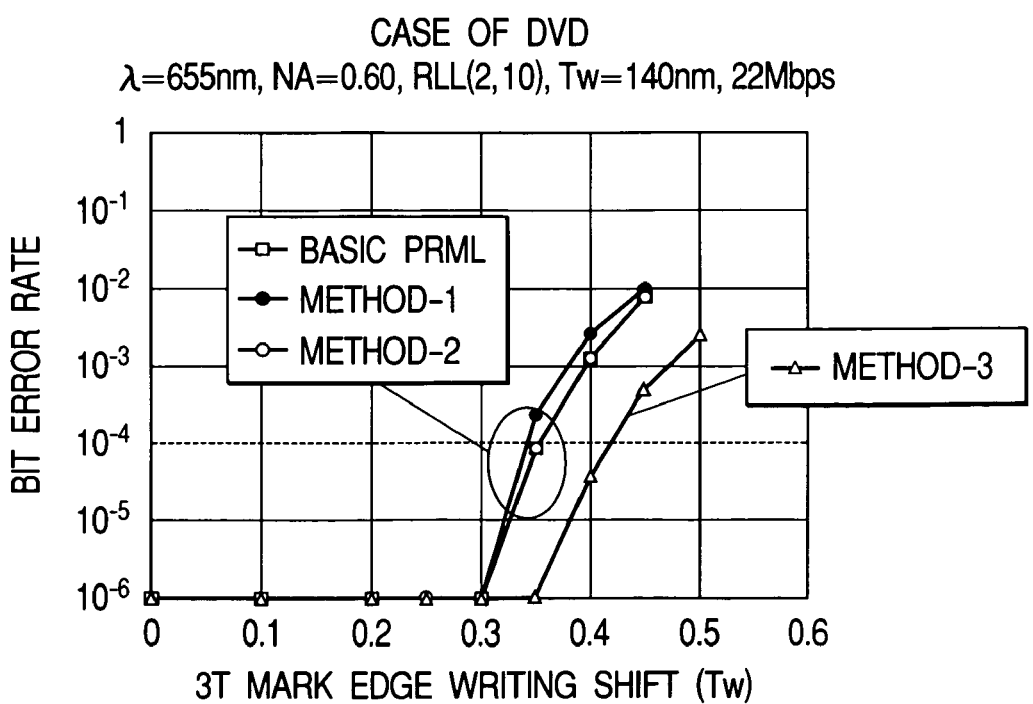

Another effect is improvement in media interchangeability. FIG. 13A shows the relationship between mark edge shift and bit error rate for the next generation DVD and FIG. 13B shows that for the current DVD. FIG. 13A illustrates bit error rates measured in the above experiment of the next-generation DVD where write/read was done while 2 T mark write pulse emission position was shifted up to 50% of detection window width Tw along the time axis. Here, the write power was selected in a way to make the asymmetry value zero. As shown in the figure, in compensation method 1 (FIG. 1) and compensation method 2 (FIG. 11) according to the present invention, the bit error rate exceeds $10^{-4}$, or the ECC (Error Correcting Code) correction limit, at 2 T mark edge writing shift 0.3 Tw, almost as in the basic PRML method (which has no asymmetry compensation function). By contrast, in compensation method 3 described in non-patent literature 1 (FIG. 2), target level compensation also takes place for mark edge shift and thus the bit error rate does not exceed $10^{-4}$ until 2 T mark edge writing shift becomes 0.4 Tw. When 2 T mark edge writing shift is, for example, 0.35 Tw, in compensation method 3, the bit error rate is below $10^{-6}$ and as a result of verification the quality of signals will be judged as good, while, in a drive which uses the basic PRML method, the situation is beyond the ECC correction limit and thus a read error will occur. Consequently, no media interchangeability will be assured. On the other hand, in compensation method 1 and compensation method 2 according to the present invention, a restriction is imposed in a way that target level compensation does not follow the mark edge shift and therefore signals which are judged as good as a result of verification can be read out even in a drive which uses the basic PRML method.

FIG. 13B shows experimental data for a commercial DVD-RAM. As in the above case, when compensation method 1 and compensation method 2 according to the present invention are used and signals are judged as good as a result of verification, the signals can be read in a drive which uses the basic PRML method. However, when 3 T mark edge writing shift is 0.35 Tw, even though the signals can be verified by compensation method 3 (described in non-patent literature 1), a read error will occur in another type of drive.

A typical criterion for optical disk verification is as follows: signals which require 50% of the ECC correction capacity are judged as not good. However, when PRML includes target level compensation, depending on the way of compensation, the bit error rate may change to a degree which exceeds the ECC correction capacity. Therefore, in order to improve readout performance and assure media interchangeability through asymmetry compensation, it is indispensable to restrict target levels as suggested by the present invention.

FIG. 14 summarizes the effects of the present invention. According to the present invention, media interchangeability is assured while asymmetry compensation is made. As discussed above, according to the present invention, write condition adjustment and focusing offset adjustment can be made adequately because target levels not corresponding to readout signal distortions which could unfavorably affect media interchangeability are used.

Figures 15A, 15B:
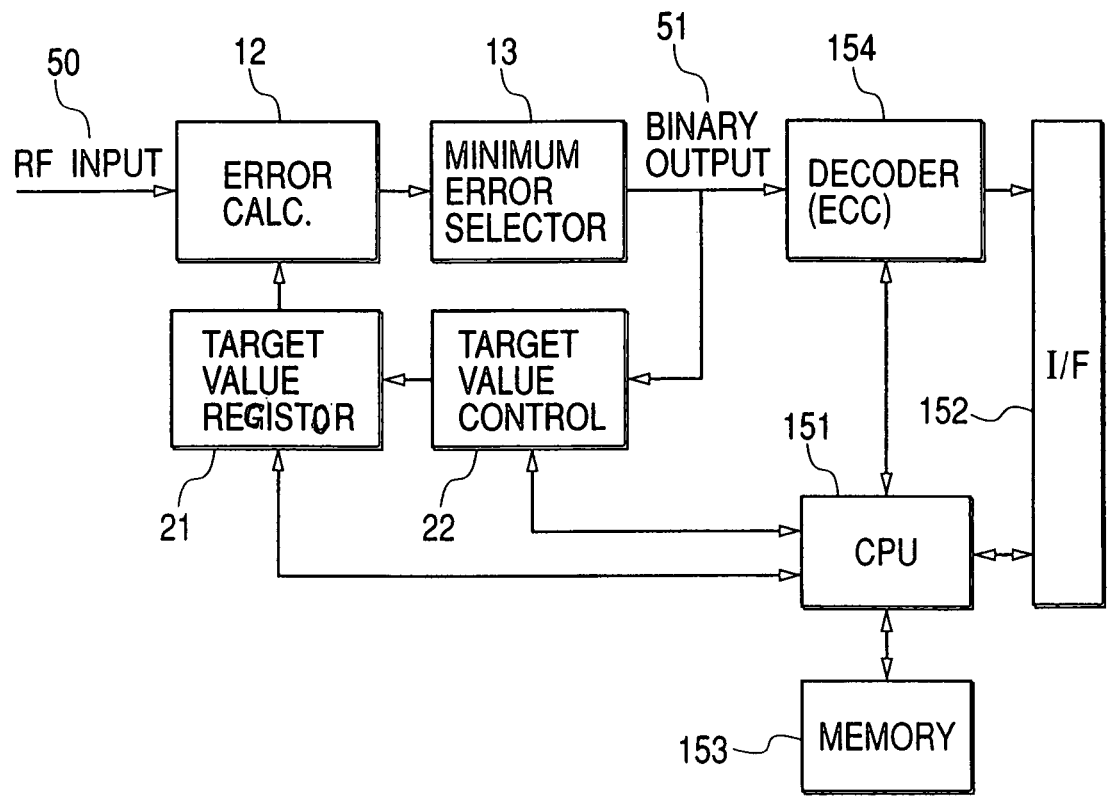
FIG. 15A is a block diagram showing the general structure of an information reproducing apparatus according to another embodiment of the present invention.
FIG. 15B is a table summarizing its effects.

FIGS. 15A and 15B concern an information reproducing apparatus according to another embodiment of the present invention. Referring to FIG. 15A, a target value register 21 has both the function of the asymmetry compensation target value table 15 and the function of the compensation target value table 16. A target value control unit 22 combines the function of the level averaging unit and the function of the time reversal symmetric unit. A decoder 154 processes the binary result 51 to decode data and ECC (error correction code), detect addresses and do other tasks depending on the modulation code and disk format in use. An interface 152 is responsible for data communication with a host computer. A target value memory 153 stores not only data of the asymmetry compensation target value table and compensation target value table but also standard table data and retry table data.

In this constitution, a CPU 151 gives instructions to constituent blocks. In order to provide a function equivalent to the function of switching between the asymmetry compensation target value table and the compensation target value table, the CPU 151 selects an adequate value from among the table data stored in the memory 153 and sets the value on the target value register 21. This makes it possible to simplify the register structure and realize a readout system which provides wide latitude in target levels because standard table data (for example, table data which correspond to PR (1, 2, 2, 1)) and retry table data are also available.

It is desirable to select between the tables depending on the mode as shown in Table 15B.

In modes 1, 2, and 3 (explained below), distortion-free targets are needed so the asymmetry compensation target value table should be used. In mode 4 (explained below), the maximum readout performance is needed so the compensation target value table (which has no restriction) should be used.

Mode 1 (Adjust Before Shipment):
Before shipment, the tilt of the head transport mechanism, spindle motor and so on are adjusted.

Mode 2 (Field Study):
When a disk medium is loaded or on a similar occasion, a study is made of the following points: focus offset, lens tilt, frequency characteristics of an equalizer or low pass filter, and write power pulse condition.

Mode 3 (Verify)
Read After Write in DVD-RAM, etc. or readout check after completion of writing in DVD-R/RW Mode 4 (Read Retry):
Retry after a read error occurs due to a defective medium, finger marks, etc.

In the Read mode, it is unnecessary to switch between the target value tables as far as no read error occurs. For table switching, overhead time to rewrite the register value is required. Therefore, it is efficient to use the asymmetry compensation target value table as it is after a field study, and use the compensation target value table as it is after a read retry.

The target value control unit 22 is controlled by the CPU 151. The CPU 151 should monitors information on the number of ECC correction bytes in the decoder 154, etc. and work as follows: if the number of correction bytes exceeds a prescribed value (this is not a read error but the risk of error is high), it gives the target value control unit 22 an instruction to update and study target values, and if the number of correction bytes is below the prescribed value, it considers the system to be stable and gives an instruction to stop updating and studying target values.

Figure 16:
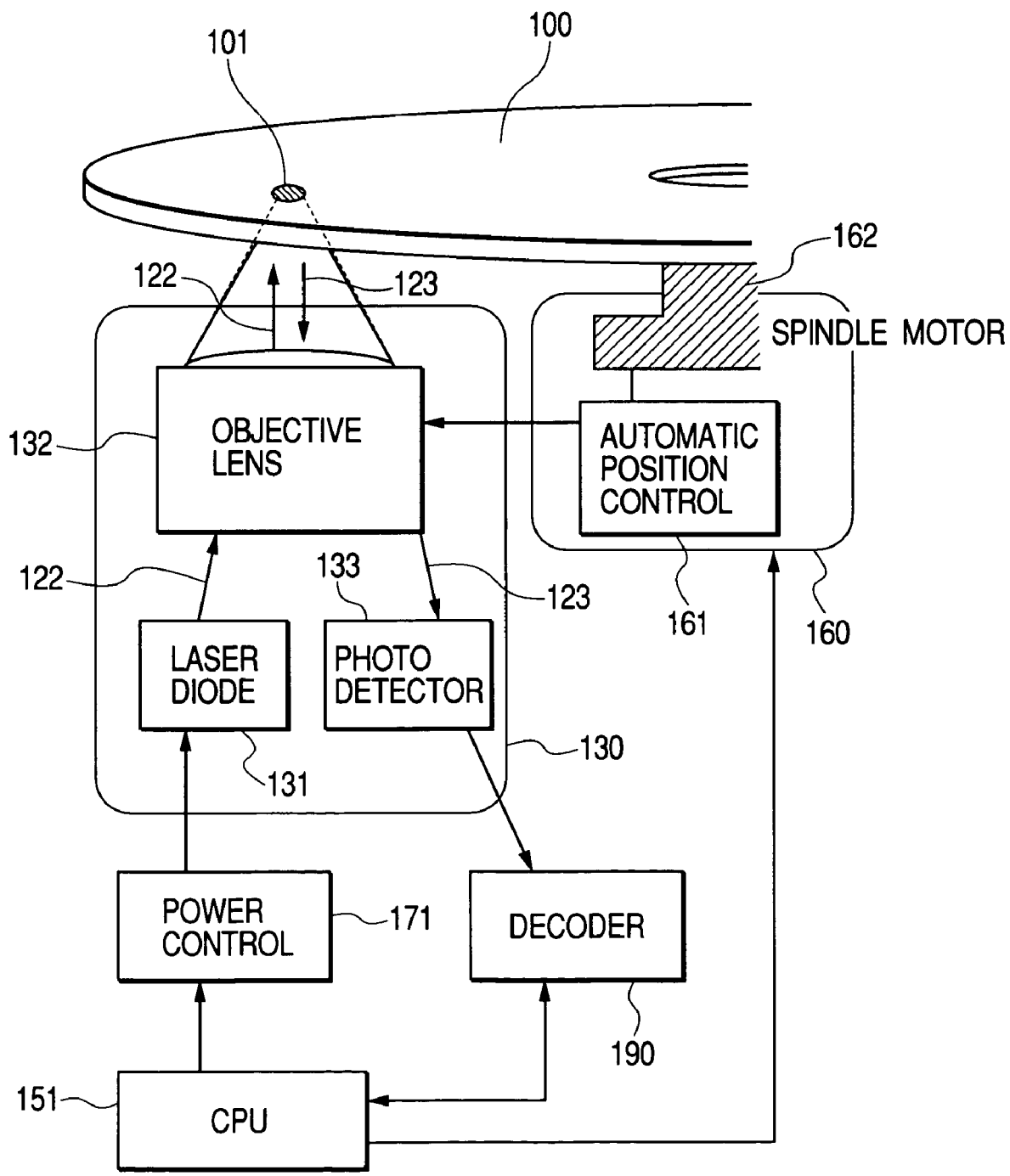
FIG. 16 shows the general structure of an optical disk device according to an embodiment of the present invention.

FIG. 16 shows the structure of an optical disk device according to an embodiment of the present invention. An optical disk medium 100 is rotated by a spindle motor 162. An optical head 130 is composed of a laser diode 131, an objective lens 132, and a photo detector 133. The head 130 is moved to a desired position in the radial direction of the optical disk medium 100 by an automatic position control 161 of a servo mechanism controller 160. A power control 171 controls the laser diode 131 in a way to emit light 122 with a light intensity as instructed by the CPU 151. The light 122 is condensed by the objective lens 132 so that a light spot 101 is formed on the optical disk medium 100. The objective lens 132 performs automatic focusing control and tracking control through the automatic position control 161. The photo detector 133 converts a reflected beam 123 from the light spot 101 into an electric signal which becomes a readout signal 130.

A decoder 190 uses the readout signal 130 to read code data and address data written on the optical disk medium. A structure which embodies the above information reproducing method provided by the present invention is incorporated in the decoder 190. The structure should consist of circuits which are illustrated in the block diagrams of FIG. 1 and FIG. 11.

In the explanation of the above embodiments of the present invention, a PLL (Phase Locked Loop) clock generator, head amplifier and so on have not been described for simple illustration. It is needless to say that a clock generator and so on are necessary for operation of the system.

What is claimed is:
1. An information reproducing method, comprising:
using a PRML (Partial Response Maximum Likelihood) method which compares readout signal levels of a readout signal at consecutive N times with target signal levels of a target signal and selects the most likely state transition to convert the readout signal into binary data, by:

changing said target signal levels adaptively with only asymmetry of said readout signal levels used for quality verification of the readout signal, wherein the target signal levels used for the quality verification are a fixed target value plus a compensation value; and the same compensation value is used for plural bit arrays for which target partial response levels are equal.

2. The information reproducing method as claimed in claim 1, wherein either an asymmetry compensation target value table or a compensation target value table is selected, and the target signal is compensated according to the selected table.

* * * * *